US006471884B1

(12) United States Patent
Fang et al.

(10) Patent No.: US 6,471,884 B1
(45) Date of Patent: Oct. 29, 2002

(54) METHOD FOR POLISHING A MEMORY OR RIGID DISK WITH AN AMINO ACID-CONTAINING COMPOSITION

(75) Inventors: Mingming Fang, Naperville, IL (US); Shumin Wang, Naperville, IL (US)

(73) Assignee: Cabot Microelectronics Corporation, Aurora, IL (US)

( * ) Notice: Subject to any disclaimer, the term of this patent is extended or adjusted under 35 U.S.C. 154(b) by 0 days.

(21) Appl. No.: 09/542,774

(22) Filed: Apr. 4, 2000

(51) Int. Cl.⁷ .............................. B24B 1/00; B44C 1/22
(52) U.S. Cl. ............................ 216/89; 216/38; 216/88; 216/103; 438/692; 438/693; 252/252; 252/79.1; 252/79.4; 451/36
(58) Field of Search ................................ 216/38, 88, 89, 216/103; 438/692, 693; 252/79.1, 79.4; 451/36

(56) References Cited

U.S. PATENT DOCUMENTS

| 5,770,095 | A | | 6/1998 | Sasaki et al. ................... 216/38 |
| 5,935,278 | A | * | 8/1999 | Ishitobi et al. ................. 51/306 |
| 5,954,997 | A | | 9/1999 | Kaufman et al. .............. 252/79.1 |
| 6,153,935 | A | * | 11/2000 | Edelstein et al. .............. 257/773 |
| 6,258,140 | B1 | * | 7/2001 | Shemo et al. ................... 51/308 |
| 6,293,848 | B1 | * | 9/2001 | Fang et al. ..................... 451/36 |

FOREIGN PATENT DOCUMENTS

| GB | 2 338 490 A | | 12/1999 | |
| JP | A-4-108887 | * | 12/1998 | ........... B24B/37/00 |

OTHER PUBLICATIONS

Database WPI, Section Ch, Week 200044, Derwent Publications Ltd., London, GB; AN 2000–492871 XP002179377 & JP 2000 160141 A (Fujimi Inc KK), Jun. 13, 2000, abstract.

Database WPI, Section Ch, Week 199221, Derwent Publications Ltd., London, GB; AN 1992–171935 XP002179378 & JP 04 108887A (Mitusbishi Kasei Corp), Apr. 9, 1992, abstract.

* cited by examiner

Primary Examiner—Robert Kunemund
Assistant Examiner—Shamim Ahmed

(57) ABSTRACT

A method of planarizing or polishing the surface of a memory or rigid disk comprising abrading at least a portion of the surface with (i) a polishing composition comprising an oxidizing agent selected from the group consisting of persulfates and peroxides, an amino acid, and water, and (ii) an abrasive.

25 Claims, No Drawings

METHOD FOR POLISHING A MEMORY OR RIGID DISK WITH AN AMINO ACID-CONTAINING COMPOSITION

TECHNICAL FIELD OF THE INVENTION

The present invention relates to a method of planarizing or polishing a substrate, particularly a memory or rigid disk.

BACKGROUND OF THE INVENTION

The demand for increased storage capacity in memory or rigid disks and the trend towards miniaturization of memory or rigid disks (due to the requests of computer manufacturers for smaller hard drives) continues to emphasize the importance of the memory or rigid disk manufacturing process, including the planarization or polishing of such disks for ensuring maximal performance. While there exist several chemical-mechanical polishing (CMP) compositions and methods for use in conjunction with semiconductor device manufacture, few conventional CMP methods or commercially available CMP compositions are well-suited for the planarization or polishing of memory or rigid disks.

In particular, such polishing compositions and/or methods can result in less than desirable polishing rates and high surface defectivity when applied to memory or rigid disks. The performance of a rigid or memory disk is directly associated with its surface quality. Thus, it is crucial that the polishing compositions and methods maximize the polishing or removal rate yet minimize surface defectivity of the memory or rigid disk following planarization or polishing.

There have been many attempts to improve the removal rate of memory or rigid disks during polishing, while minimizing defectivity of the polished surface during planarization or polishing. For example, U.S. Pat. No. 4,769,046 discloses a method for polishing a nickel-plated layer on a rigid disk using a composition comprising aluminum oxide and a polishing accelerator such as nickel nitrate, aluminum nitrate, or mixtures thereof.

There remains a need, however, for improved methods of planarizing or polishing memory or rigid disks at a high removal rate, while minimizing surface defectivity. The present invention seeks to provide such a method. These and other advantages of the present inventive method will be apparent from the description of the invention provided herein.

BRIEF SUMMARY OF THE INVENTION

The present invention provides a method of planarizing or polishing the surface of a memory or rigid disk comprising abrading at least a portion of the surface with (i) a polishing composition comprising an oxidizing agent selected from the group consisting of persulfates and peroxides, an amino acid, and water, and (ii) an abrasive.

DESCRIPTION OF THE PREFERRED EMBODIMENTS

The present invention provides a method of planarizing or polishing a memory or rigid disk. The method comprises contacting the surface of a memory or rigid disk with (i) a polishing composition comprising an oxidizing agent selected from the group consisting of persulfates and peroxides, an amino acid, and water, and (ii) an abrasive, and abrading at least a portion of the surface of the memory or rigid disk by movement of the polishing composition relative to the memory or rigid disk. Such contacting and abrading can take place by any suitable technique. For example, the polishing composition can be applied to the surface of the memory or rigid disk and used to abrade at least a portion of the surface of the memory or rigid disk through use of a polishing pad.

The term "memory or rigid disk" refers to any magnetic disk, hard disk, rigid disk, or memory disk for retaining information in electromagnetic form. The memory or rigid disk typically has a surface that comprises nickel-phosphorus, but the memory or rigid disk surface can comprise any other suitable material.

The abrasive can be any suitable abrasive. Desirably, the abrasive is a metal oxide abrasive. Metal oxide abrasives include, for example, alumina, silica, titania, ceria, zirconia, germania, magnesia, and combinations thereof. Preferably, the abrasive of the present inventive method is a condensation-polymerized metal oxide, e.g., condensation-polymerized silica. Condensation-polymerized silica typically is prepared by condensing $Si(OH)_4$ to form colloidal particles. Such an abrasive can be prepared in accordance with U.S. Pat. No. 5,230,833 or can be obtained as any of various commercially available products, such as the Akzo-Nobel Bindzil 50/80 product and the Nalco 1050, 2327, and 2329 products, as well as other similar products available from DuPont, Bayer, Applied Research, Nissan Chemical, and Clariant.

The abrasive desirably is such that about 90% or more of the abrasive particles (by number) within the abrasive have a particle size no greater than 100 nm. Preferably, the abrasive particles are such that at least about 95%, 98%, or even substantially all (or actually all) of the abrasive particles (by number) within the abrasive have a particle size no greater than 100 nm. These particle size preferences for the abrasive particles (i.e., whereby at least about 90%, 95%, 98%, substantially all, and all of the abrasive particles (by number) within the abrasive are no greater than a specific size of abrasive particle) also can pertain to other particle sizes, such as 95 nm, 90 nm, 85 nm, 80 nm, 75 nm, 70 nm, and 65 nm.

Similarly, the abrasive can be such that at least about 90%, 95%, 98%, or even substantially all (or actually all) of the particles of the abrasive (by number) within the abrasive have a particle size no less than 5 nm. These particle size preferences for the abrasive particles (i.e., whereby at least about 90%, 95%, 98%, substantially all, and all of the abrasive particles (by number) within the abrasive are no less than a specific size of abrasive particle) also can pertain to other particle sizes, such as 7 nm, 10 nm, 15 nm, 25 nm, and 30 nm.

The percentage values used herein to describe the nature of the abrasive in terms of particle size are percentages "by number," rather than being weight percentages, unless otherwise noted. The particle size of the abrasive particles within the abrasive refers to the particle diameter. The particle size can be measured by any suitable technique. The particle size values set forth herein are based on a visual inspection, specifically by way of transmission electron micrography (TEM), of a statistically significant sample of the abrasive, preferably at least 200 particles.

The particle size distribution of the abrasive particles within the abrasive can be characterized by geometric standard deviation by number, referred to as sigma-g ($\sigma_g$). The $\sigma_g$ values can be obtained by dividing (a) the diameter at which 84% of the abrasive particles (by number) within the abrasive are less than by (b) the diameter at which 16% of the abrasive particles (by number) are less than (i.e., $\sigma_g = d_{84}/$ $d_{16}$). Monodispersed abrasive particles have $\sigma_g$ value of about 1. As the abrasive particles become polydispersed (i.e., include particles of increasingly different size), the $\sigma_g$ value of the abrasives particles increases above 1. The abrasive particles typically have a $\sigma_g$ value of about 2.5 or less (e.g., about 2.3 or less). The abrasive particles desirably have a $\sigma_g$ value of at least about 1.1 (e.g., about 1.1–2.3 (e.g., 1.1–1.3), preferably a $\sigma_g$ value of at least about 1.3 (e.g., about 1.5–2.3 or even about 1.8–2.3).

Any suitable amount of the abrasive can be present in the polishing composition. Preferably, the abrasive is present in a concentration of about 0.1–30 wt. % of the composition, e.g., about 1–28 wt. % of the composition. More preferably, the abrasive is present in a concentration of about 3–25 wt. % of the composition, e.g., about 5–20 wt. % of the composition, or even about 6–15 wt. % of the composition. Alternatively, the abrasive, in whole or in part, can be fixed (e.g., embedded) on or in the polishing pad.

The oxidizing agent can be any suitable oxidizing agent. Suitable oxidizing agents include, for example, persulfates and peroxides. Preferably, the oxidizing agent is selected from the group consisting of ammonium persulfate, potassium persulfate, sodium persulfate, and hydrogen peroxide.

Any suitable amount of the oxidizing agent can be present in the polishing composition. The oxidizing agent desirably is present in an amount of about 0.01–10 wt. % of the composition, e.g., about 0.1–10 wt. %. More preferably, the oxidizing agent is present in an amount of about 0.5–8 wt. % of the composition, e.g., about 1–6, or even about 2–6 wt. %.

The amino acid can be any suitable amino acid. Suitable amino acids include, for example, amino acids containing 1–8 carbon atoms, e.g., amino acids containing 1–7 carbon atoms, or even amino acids containing 1–6 carbon atoms. Preferably, the amino acid of the composition of the present inventive method is glycine, iminodiacetic acid, alanine, valine, leucine, isoleucine, serine, and threonine. More preferably, the amino acid is glycine or alanine.

Any suitable amount of the amino acid can be present in the polishing composition. The amino acid desirably is present in an amount of about 0.01–10 wt. % of the composition, e.g., about 0.1–10 wt. %. More preferably, the amino acid is present in an amount of about 0.5–8 wt. % of the composition, e.g., about 0.75–8 wt. %. Most preferably, the amino acid is present in an amount of about 1–7 wt. % of the composition, e.g., about 2–6 wt. %, or even 3–5 wt. %.

The pH of the polishing composition can be any suitable pH. Preferably, the pH of the composition is about 1–7, e.g., about 1–6. More preferably, the pH of the composition is about 2–5, e.g., about 2–4, or even about 3–4.

The pH of the polishing composition can be adjusted, if necessary, in any suitable manner, e.g., by adding a pH adjuster to the composition. Suitable pH adjusters include, for example, bases such as potassium hydroxide, ammonium hydroxide, sodium carbonate, and mixtures thereof, as well as acids such as mineral acids (e.g., nitric acid and sulfuric acid) and organic acids (e.g., acetic acid, citric acid, malonic acid, succinic acid, tartaric acid, and oxalic acid).

The polishing composition optionally can further comprise one or more other additives. Such additives include surfactants (e.g., cationic surfactants, anionic surfactants, nonionic surfactants, amphoteric surfactants, fluorinated surfactants, and mixtures thereof), polymeric stabilizers or other surface active dispersing agents (e.g., phosphoric acid, organic acids, tin oxides, and phosphonate compounds), and additional polishing accelerators such as catalysts and chelating or complexing agents (e.g., metal, particularly ferric, sulfates, compounds with carboxylate, hydroxyl, sulfonic, and/or phosphonic groups, di-, tri-, multi-, and poly-carboxylic acids and salts (such as tartaric acids and tartrates, malic acid and malates, malonic acid and malonates, gluconic acid and gluconates, citric acid and citrates, phthalic acid and phthalates, pyrocatecol, pyrogallol, gallic acid and gallates, tannic acid and tannates), amine-containing compounds (such as primary, secondary, tertiary, and quaternary amines and amino acids), and mixtures thereof).

EXAMPLES

The following examples further illustrate the present invention but, of course, should not be construed as in any way limiting its scope.

The memory or rigid disks referenced in all of the following examples are commercially available memory or rigid disks obtained from Seagate Technology. The memory or rigid disks were nickel-phosphor coated (plated) disks with aluminum substrates. The memory or rigid disks had undergone a pre-polishing process prior to being used in the following examples, and each memory or rigid disk had a surface roughness of 10–50 Å.

The polishing pads used in all examples were 25.4 cm diameter Politex Hi pads manufactured by Rodel. The memory or rigid disks in Examples 1–3 were polished using a table top polishing machine manufactured by Streuers (West Lake, Ohio) with a platen speed of 150 rpm, a polishing carrier speed of 150 rpm, a slurry flow rate of 100 ml/min, and a polishing downforce of 50 N. The memory or rigid disks in Example 4 were polished using a Strausbaugh 6EE polishing machine (San Luis Obispo, Calif.) with a polishing pad speed of 55–65 rpm and a polishing downforce of 10–12.5 N.

Nickel-phosphor polishing rates were calculated by weighing the clean, dry memory or rigid disk prior to polishing and following polishing. The weight loss was converted to a memory or rigid disk thickness loss using a nickel-phosphor density of 8.05 g/cm$^3$. To allow for more precise comparisons between polishing compositions within each of the following examples despite differences in nominally identical polishing conditions (particularly with respect to polishing pad wear during the course of testing), a control composition with 4 wt. % silica (specifically, Akzo-Nobel Bindzil 50/80 product) and 0.25 wt. % hydroxylamine nitrate (HAN), wherein the control composition had a pH of 3.5, was utilized at regular intervals. The actual polishing rate of each test composition was then converted to a relative polishing rate by dividing the polishing rate of the test composition by the polishing rate of the most recently evaluated control composition. Accordingly, the relative polishing rates of the test compositions are comparable across all examples.

Example 1

This example illustrates that the polishing rate of a memory or rigid disk achievable by the present inventive method is dependent on the identity of the amino acid in the polishing composition.

Nickel-phosphor plated memory or rigid disks were polished separately with six different polishing compositions with 4 wt. % silica (specifically, Akzo-Nobel Bindzil 50/80 product), 2 wt. % H$_2$O$_2$, and 1–3 wt. % amino acid (specifically, glycine, DL-alanine, iminodiacetic acid, or DL-serine), wherein each of the polishing compositions had a pH of 2.5. For comparison purposes, nickel-phosphorplated memory or rigid disks also were polished with a control polishing composition as described above and with three "comparative" polishing compositions with 4 wt. % silica (specifically, Akzo-Nobel Bindzil 50/80 product), alone and with either 2 wt. % $H_2O_2$ or 1 wt. % amino acid (specifically, glycine), wherein all comparison compositions had a pH of 2.5. Following use of the polishing compositions, the relative polishing rate of each composition was determined, with the resulting data set forth in Table 1.

TABLE 1

| Composition | Amino Acid | $H_2O_2$ | Relative Polishing Rate |
|---|---|---|---|
| Control | None | (HAN) | 1.0 |
| Comparative 1 | None | None | 0.8 |
| Comparative 2 | None | 2 | 1.4 |
| Comparative 3 | 1 wt. % Glycine | None | 0.9 |
| 1A | 1 wt. % Glycine | 2 | 2.5 |
| 1B | 3 wt. % Glycine | 2 | 2.0 |
| 1C | 1 wt. % DL-Alanine | 2 | 2.3 |
| 1D | 3 wt. % DL-Alanine | 2 | 1.9 |
| 1E | 2 wt. % Imino-diacetic acid | 2 | 2.4 |
| 1F | 2 wt. % DL-Serine | 2 | 1.6 |

As is apparent from the data set forth in Table 1, the relative polishing rates exhibited by polishing compositions containing both $H_2O_2$ and amino acids (Compositions 1A–1F) were greater than the relative polishing rates of the control polishing composition and of the comparative compositions that did not contain both $H_2O_2$ and an amino acid (Comparative Compositions 1–3). Moreover, the relative polishing rates exhibited by the polishing compositions with $H_2O_2$ and either 1 wt. % glycine, 1 wt. % DL-alanine, or 2 wt. % iminodiacetic acid (Compositions 1A, 1C, and 1E) were greater than the relative polishing rates for the polishing compositions with $H_2O_2$ and either 3 wt. % glycine, 3 wt. % DL-alanine, or 2 wt. % DL-serine (Compositions 1B, 1D, and 1F). These results demonstrate the significance of the combination of an oxidizing agent and an amino acid in the context of the present inventive method, as well as the effect of the particular amino acid on the polishing rate achievable by the present inventive method.

Example 2

This example illustrates that the polishing rate of memory or rigid disks achievable by the present inventive method is dependent on the identity of the oxidizing agent in the polishing composition, as well as the amino acid concentration and the pH of polishing composition.

Nickel-phosphor plated memory or rigid disks were polished separately with eight different polishing compositions with 4 wt. % silica (specifically, Akzo-Nobel Bindzil 50/80 product), 1–3 wt. % glycine, and 2 wt. % oxidizing agent (specifically, $H_2O_2$ or ammonium persulfate (APS)), wherein each of the polishing compositions had a pH of 2.5–3.5. Following the use of the polishing compositions, the relative polishing rate of each composition was determined, with the resulting data set forth in Table 2. For comparison purposes, Table 2 also sets forth the relative polishing rates for the control polishing composition as described above and for the three "comparative" polishing compositions described in Example 1 (Comparative Compositions 1–3).

TABLE 2

| Composition | Wt. % Glycine | Oxidizing Agent | pH | Relative Polishing Rate |
|---|---|---|---|---|
| Control | None | (HAN) | 3.5 | 1.0 |
| Comparative 1 | None | None | 2.5 | 0.8 |
| Comparative 2 | None | 2 wt. % $H_2O_2$ | 2.5 | 1.4 |
| Comparative 3 | 1 | None | 2.5 | 0.9 |
| 2A | 1 | 2 wt. % APS | 2.5 | 2.3 |
| 2B | 3 | 2 wt. % APS | 2.5 | 1.7 |
| 2C | 1 | 2 wt. % APS | 3.5 | 2.0 |
| 2D | 3 | 2 wt. % APS | 3.5 | 1.7 |
| 2E | 1 | 2 wt. % $H_2O_2$ | 2.5 | 2.5 |
| 2F | 3 | 2 wt. % $H_2O_2$ | 2.5 | 2.0 |
| 2G | 1 | 2 wt. % $H_2O_2$ | 3.5 | 1.7 |
| 2H | 3 | 2 wt. % $H_2O_2$ | 3.5 | 1.6 |

As is apparent from the data set forth in Table 2, the relative polishing rates exhibited by the polishing compositions with 1 wt. % glycine and an oxidizing agent (Compositions 2A, 2C, 2E, and 2G) were greater than the relative polishing rates for polishing compositions with 3 wt. % glycine and an oxidizing agent (Compositions 2B, 2D, 2F, and 2H), when all other conditions were the same. Moreover, the relative polishing rates exhibited by the compositions containing glycine and an oxidizing agent with a pH of 2.5 (Compositions 2A, 2B, 2E, and 2F) were the same or greater than the relative polishing rates for compositions containing glycine and an oxidizing agent with a pH of 3.5 (Compositions 2C, 2D, 2G, and 2H), when all other conditions were the same. These results demonstrate the significance of the particular oxidizing agent, the concentration of the amino acid, and the pH on the polishing rate achievable by the present inventive method.

Example 3

This example illustrates that the polishing rate of memory or rigid disks achieved by the composition of the present inventive method is dependent on the identity of the oxidizing agent in the polishing composition, as well as the amino acid concentration and the pH of the polishing composition.

Nickel-phosphorplated memory or rigid disks were polished separately with eight different polishing compositions with 4 wt. % silica (specifically, Akzo-Nobel Bindzil 50/80 product), 1–3 wt. % DL-alanine, and 2 wt. % oxidizing agent (specifically, $H_2O_2$ or potassium persulfate (KPS)), wherein each of the polishing compositions had a pH of 2.5–3.5. Following use of the polishing compositions, the polishing rate of each composition was determined, with the resulting data set forth in Table 3. For comparison purposes, Table 3 also sets forth the relative polishing rates for the control polishing composition as described above and for two "comparative" polishing compositions described in Example 1 (i.e., Comparative Compositions 1 and 2).

TABLE 3

| Composition | Wt. % DL-Alanine | Oxidizing Agent | pH | Relative Polishing Rate |
|---|---|---|---|---|
| Control | None | (HAN) | 3.5 | 1.0 |
| Comparative 1 | None | None | 2.5 | 0.8 |
| Comparative 2 | None | 2 wt. % $H_2O_2$ | 2.5 | 1.4 |
| 3A | 1 | 2 wt. % KPS | 2.5 | 2.0 |
| 3B | 3 | 2 wt. % KPS | 2.5 | 1.5 |
| 3C | 1 | 2 wt. % KPS | 3.5 | 1.7 |
| 3D | 3 | 2 wt. % KPS | 3.5 | 1.5 |

TABLE 3-continued

| Composition | Wt. % DL-Alanine | Oxidizing Agent | pH | Relative Polishing Rate |
|---|---|---|---|---|
| 3E | 1 | 2 wt. % $H_2O_2$ | 2.5 | 2.3 |
| 3F | 3 | 2 wt. % $H_2O_2$ | 2.5 | 1.9 |
| 3G | 1 | 2 wt. % $H_2O_2$ | 3.5 | 1.7 |
| 3H | 3 | 2 wt. % $H_2O_2$ | 3.5 | 1.5 |

As is apparent from the data set forth in Table 3, the relative polishing rates exhibited by the compositions with 1 wt. % DL-alanine and an oxidizing agent (Compositions 3A, 3C, 3E, and 3G) were greater than the relative polishing rates for compositions with 3 wt. % DL-alanine and an oxidizing agent (Compositions 3B, 3D, 3F, and 3H), when all other conditions were the same. Moreover, the relative polishing rates exhibited by the compositions containing DL-alanine and an oxidizing agent with a pH of 2.5 (Compositions 3A, 3B, 3E, and 3F) were the same or greater than the relative polishing rates for compositions containing DL-alanine and an oxidizing agent with a pH of 3.5 (Compositions 3C, 3D, 3G, and 3H), when all other conditions were the same. These results demonstrate the significance of the particular oxidizing acid, the concentration of the amino acid, and the pH on the polishing rate achievable by the present inventive method.

Example 4

This example illustrates the significance of the concentration of the amino acid in the polishing composition on the polishing rate of a memory or rigid disk achievable by the present inventive method.

Nickel-phosphorplated memory or rigid disks were polished separately with six different polishing compositions with 4 wt. % silica (specifically, Akzo-Nobel Bindzil 50/80 product), 1.5 wt. % $H_2O_2$, and 0.1–1.3 wt. % glycine, wherein each of the polishing compositions had a pH of 2.5. Following use of the polishing compositions, the polishing rate of each composition was determined, with the resulting data set forth in Table 4. For comparison purposes, Table 4 also sets forth the relative polishing rate for the control polishing composition as described above.

TABLE 4

| Composition | Wt. % Glycine | Wt. % $H_2O_2$ | Relative Polishing Rate |
|---|---|---|---|
| Control | None | (HAN) | 1.0 |
| 4A | 0.1 | 1.5 | 1.1 |
| 4B | 0.35 | 1.5 | 1.3 |
| 4C | 0.5 | 1.5 | 1.5 |
| 4D | 0.7 | 1.5 | 1.8 |
| 4E | 1 | 1.5 | 2.3 |
| 4F | 1.3 | 1.5 | 1.7 |

As is apparent from the data set forth in Table 4, the relative polishing rates exhibited by polishing compositions containing $H_2O_2$ and 0.7–1.3 wt. % glycine (Compositions 4D–F) were greater than the relative polishing rates exhibited by polishing compositions containing $H_2O_2$ and 0.1–0.5 wt. % glycine (Compositions 4A–C). Moreover, the relative polishing rate exhibited by the polishing composition with $H_2O_2$ and 1 wt. % glycine (Composition 4E) is greater than the relative polishing 25 rates of polishing compositions with $H_2O_2$ and glycine concentrations less than 1 wt. % (Compositions 4A–D) and the relative polishing rate of the polishing composition with $H_2O_2$ and a glycine concentration greater than 1 wt. % (Compositions 4F). These results demonstrate the significance of the concentration of the amino acid on the polishing rate achievable by the present inventive method.

All of the references cited herein, including patents, patent applications, and publications, are hereby incorporated in their entireties by reference.

While this invention has been described with an emphasis upon preferred embodiments, it will be obvious to those of ordinary skill in the art that variations of the preferred embodiments may be used and that it is intended that the invention may be practiced otherwise than as specifically described herein. Accordingly, this invention includes all modifications encompassed within the following claims to the extent allowed by applicable law or regulation.

What is claimed is:

1. A method for planarizing or polishing the surface of a memory or rigid disk comprising abrading at least a portion of the surface with (i) a polishing composition comprising (a) an oxidizing agent selected from the group consisting of persulfates and peroxides, (b) an amino acid, and (c) water, and (ii) an abrasive selected from the group consisting of alumina, silica, titania, ceria, germania, magnesia, and combinations thereof, wherein the amino acid is present in an amount of about 0.1–10 wt. % of the composition.

2. The method of claim 1, wherein the surface of the memory or rigid disk comprises nickel-phosphorus.

3. The method of claim 1, wherein the abrasive is silica.

4. The method of claim 3, wherein the abrasive is condensation-polymerized silica.

5. The method of claim 1, wherein about 90% or more of the abrasive particles (by number) have a particle size no greater than 100 nm.

6. The method of claim 5, wherein substantially all of the abrasive particles (by number) have a particle size no greater than 100 nm.

7. The method of claim 1, wherein the abrasive particles have a particle size distribution of abrasive particles characterized by a geometric standard deviation by number ($\sigma_g$) of at least about 1.3.

8. The method of claim 1, wherein the abrasive is present in a concentration of about 0.1–30 wt. % of the composition.

9. The method of claim 1, wherein the abrasive is fixed on or in a polishing pad.

10. The method of claim 1, wherein the oxidizing agent is ammonium persulfate, potassium persulfate, or sodium persulfate.

11. The method of claim 1, wherein the oxidizing agent is hydrogen peroxide.

12. The method of claim 1, wherein the oxidizing agent is present in an amount of about 0.01–10 wt. % of the composition.

13. The method of claim 1, wherein the amino acid is selected from the group consisting of glycine, iminodiacetic acid, alanine, valine, leucine, isoleucine, serine, and threonine.

14. The method of claim 13, wherein the amino acid is glycine.

15. The method of claim 13, wherein the amino acid is alanine.

16. The method of claim 1, wherein the pH of the polishing composition is about 1–6.

17. The method of claim 16, wherein the pH of the polishing composition is about 2–4.

18. The method of claim 3, wherein about 90% or more of the abrasive particles (by number) have a particle size no greater than 100 nm.

19. The method of claim 3, wherein the oxidizing agent is ammonium persulfate, potassium persulfate, or sodium persulfate.

20. The method of claim 3, wherein the oxidizing agent is hydrogen peroxide.

21. The method of claim 3, wherein the oxidizing agent is present in an amount of about 0.01–10 wt. % of the composition.

22. The method of claim 3, wherein the amino acid is selected from the group consisting of glycine, iminodiacetic acid, alanine, valine, leucine, isoleucine, serine, and threonine.

23. The method of claim 22, wherein the amino acid is glycine.

24. The method of claim 22, wherein the amino acid is alanine.

25. The method of claim 3, wherein the pH of the polishing composition is about 2–4.

* * * * *